(12) United States Patent
Yu et al.

(10) Patent No.: US 11,635,651 B2
(45) Date of Patent: Apr. 25, 2023

(54) DISPLAY PANEL

(71) Applicant: HannStar Display Corporation, Taipei (TW)

(72) Inventors: Chia-Hua Yu, Tainan (TW); Kun Tsai Huang, Kaohsiung (TW); Feng-Wei Kuo, Kaohsiung (TW); Luo-Yi Wu, Tainan (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 17/499,838

(22) Filed: Oct. 12, 2021

(65) Prior Publication Data
US 2022/0128858 A1  Apr. 28, 2022

(30) Foreign Application Priority Data
Oct. 26, 2020  (CN) .......................... 202011158452.4

(51) Int. Cl.
*G02F 1/1335* (2006.01)
*G02F 1/1343* (2006.01)

(52) U.S. Cl.
CPC .. *G02F 1/133512* (2013.01); *G02F 1/134309* (2013.01); *G02F 1/134363* (2013.01); *G02F 2201/124* (2013.01)

(58) Field of Classification Search
CPC ......... G02F 1/133512; G02F 1/134318; G02F 1/134363; G02F 2201/123
See application file for complete search history.

(56) References Cited

U.S. PATENT DOCUMENTS

| 2009/0040449 A1* | 2/2009 | Jo ...................... G02F 1/134363 349/187 |
| 2009/0057667 A1* | 3/2009 | Yang .................... H01L 27/124 257/E21.414 |
| 2012/0050246 A1* | 3/2012 | Morimoto ......... G02F 1/134363 345/87 |
| 2015/0036089 A1* | 2/2015 | Liang .................. G02F 1/13439 438/38 |

\* cited by examiner

*Primary Examiner* — Jessica M Merlin
(74) *Attorney, Agent, or Firm* — JCIPRNET

(57) ABSTRACT

The invention provides a display panel, which includes a first substrate, a second substrate, a liquid crystal layer, a light shielding pattern layer and a plurality of pixel structures. The liquid crystal layer is disposed between the first substrate and the second substrate, and includes a plurality of negative liquid crystal molecules. Each of the pixel structures includes a first electrode and a second electrode. The first electrode has an electrode opening and a first finger portion extending into the electrode opening. The second electrode has two second finger portions overlapping the electrode opening. The first finger portion and the two second finger portions are alternately arranged along a first direction inside the electrode opening and extend in a second direction.

10 Claims, 12 Drawing Sheets

DISPLAY PANEL

CROSS-REFERENCE TO RELATED APPLICATION

This application claims the priority benefit of China application no. 202011158452.4, filed on Oct. 26, 2020. The entirety of the above-mentioned patent application is hereby incorporated by reference herein and made a part of this specification.

TECHNICAL FIELD

The invention relates to a display technology, and more particularly, relates to a display panel.

BACKGROUND

At present, the market's performance requirements for liquid crystal displays are toward features including high contrast, no gray scale inversion, little color shift, high luminance, high color richness, high color saturation, high speed, fast response and wide viewing angle. Technologies that can achieve wide viewing angle include, for example, twisted nematic (TN) plus wide viewing film, in-plane switching (IPS) liquid crystal displays, marginal field switching liquid crystal display, fringe field switching (FFS) liquid crystal displays and multi-domain vertical alignment (MVA) liquid crystal displays. Among them, in-plane switching and marginal field switching liquid crystal displays have a better wide viewing angle effect than twisted nematic liquid crystal displays.

In the case of in-plane switching liquid crystal displays, in order to achieve the effect of wide viewing angle, some alignment patterning (e.g., such as slits), is used to make the liquid crystal molecules in each pixel exhibit a multi-directional arrangement, thereby obtaining several different alignment domains. Under normal operation, the liquid crystal molecules can be arranged stably. However, when an external force presses the liquid crystal display panel, the cell gap between the two substrates changes, resulting in a change in the electric field at the pressurized area, which makes the liquid crystal molecules at the pressurized area align disorder. More specifically, when the liquid crystal panel is pressed by the external force (e.g., finger pressure), the liquid crystal molecules are affected by the twisted electric field and cannot quickly return to an original arrangement state, which often causes finger mura and seriously affects the display quality of the liquid crystal display panel.

SUMMARY

The invention is directed to a display panel in which am arrangement state of liquid crystal molecules has better press recovery.

According to an embodiment of the invention, the display panel includes a first substrate, a second substrate, a liquid crystal layer and a plurality of pixel structures. The first substrate has a plurality of opening areas separated each other. The second substrate is disposed opposite to the first substrate. The liquid crystal layer is disposed between the first substrate and the second substrate, and includes a plurality of negative liquid crystal molecules. The pixel structures respectively overlap the opening areas, and each of the pixel structures includes a first electrode and a second electrode overlapping one of the opening areas and located on the same side of the liquid crystal layer. The first electrode has an electrode opening overlapping the one of the opening areas and a first finger portion extending into the electrode opening. The second electrode has two second finger portions overlapping the electrode opening. The first finger portion and the two second finger portions are alternately arranged along a first direction inside the electrode opening and extending in a second direction. The first direction intersects the second direction. A voltage is applied between the first electrode and the second electrode of each of the pixel structures. A transmissive zone and a first dark zone are provided between one of the two second finger portions and the first finger portion of each of the pixel structures of the display panel. The first dark zone is located between the transmissive zone and a first edge of the display panel for defining each of the opening areas in the second direction. The first dark zone has a first width on one side of the second finger portions in the second direction. Each of the opening areas has an opening length in the second direction, and a percentage value of the first width to the opening length is less than 5%.

In the display panel according to an embodiment of the invention, the first finger portion has a first open end and a first connecting end opposite to each other. The first open end is closer to the second electrode than the first connecting end in the second direction. The first connecting end is connected to an opening edge of the first electrode for defining the electrode opening. Each of the two second finger portions has a second open end and a second connecting end opposite to each other. The second open end is closer to the first electrode than the second connecting end in the second direction. The first dark zone is located between the first connecting end of the first finger portion and the second open end of one of the two second finger portions.

In the display panel according to an embodiment of the invention, the second electrode further includes a connecting portion overlapping the electrode opening. The second connecting end of each of the two second finger portions is connected to the connecting portion. A second dark zone is further provided between the one of the two second finger portions and the first finger portion of each of the pixel structures of the display panel. The second dark zone is located on one side of the transmissive zone away from the first dark zone. The second dark zone has a second width on one side of the first finger portion in the second direction, and a percentage value of the second width to the opening length is less than 5%.

In the display panel according to an embodiment of the invention, the second dark zone is located between the first open end of the first finger portion and the second connecting end of the one of the two second finger portions.

In the display panel according to an embodiment of the invention, the first finger portion has a first extension and a first connecting end and a first open end disposed on opposite sides of the first extension. The first connecting end overlaps the first edge of the display panel for defining the corresponding opening area. An extending direction of the first connecting end intersects an extending direction of the first extension. Each of the two second finger portions has a second extension and a second open end disposed between the second extension and the first edge. An extending direction of the second extension is parallel to the extending direction of the first extension, and the second open end has a first inclined edge parallel to the extending direction of the first connecting end.

In the display panel according to an embodiment of the invention, the first dark zone is located on one side of the second open end of the one of the two second finger portions facing away from the first inclined edge.

In the display panel according to an embodiment of the invention, the second electrode further includes a connecting portion overlapping the electrode opening. Each of the two second finger portions further includes a second connecting end connecting the second extension and the connecting portion. The second connecting end of the other one of the two second finger portions has a second inclined edge on one side closer to the first open end. An extending direction of the second inclined edge is inclined to the extending direction of the second extension, and the first open end has a third inclined edge parallel to the second inclined edge on one side opposite to the second inclined edge.

In the display panel according to an embodiment of the invention, a second dark zone is further provided between the one of the two second finger portions and the first finger portion of each of the pixel structures of the display panel. The second dark zone is located on one side of the transmissive zone away from the first dark zone, and the second dark zone is located on one side of the first open end facing away from the third inclined edge.

In the display panel according to an embodiment of the invention, the first electrode further includes a first opening edge and a second opening edge for defining the electrode opening. The first connecting end of the first finger portion connects the first opening edge. The second opening edge connects the first opening edge and is opposite to the first inclined edge of the second open end of the one of the two second finger portions, and an extending direction of the second opening edge is parallel to an extending direction of the first inclined edge.

In the display panel according to an embodiment of the invention, a width of a portion where a normal projection of the first dark zone on the first substrate is connected to a normal projection of the first edge for defining the corresponding opening area on the first substrate in the first direction is equal to a distance between the first finger portion and the one of the two second finger portions.

Based on the above, in the display panel of an embodiment of the invention, the first electrode and the second electrode of the pixel structure are located on the same side of the liquid crystal layer, and the first finger portion of the first electrode is located between the two second finger portions of the second electrode. The negative liquid crystal molecules of the liquid crystal layer can allow the width of the dark zone between the first finger portion and the second finger portions on one side of the open end of the finger portion to the opening length to be less than 5%. In this way, when being pressed by the external force, the liquid crystal molecules in the dark zone can quickly return to the original arrangement state, so as to avoid the occurrence of finger mura.

DETAILED DESCRIPTION

Figure 1:
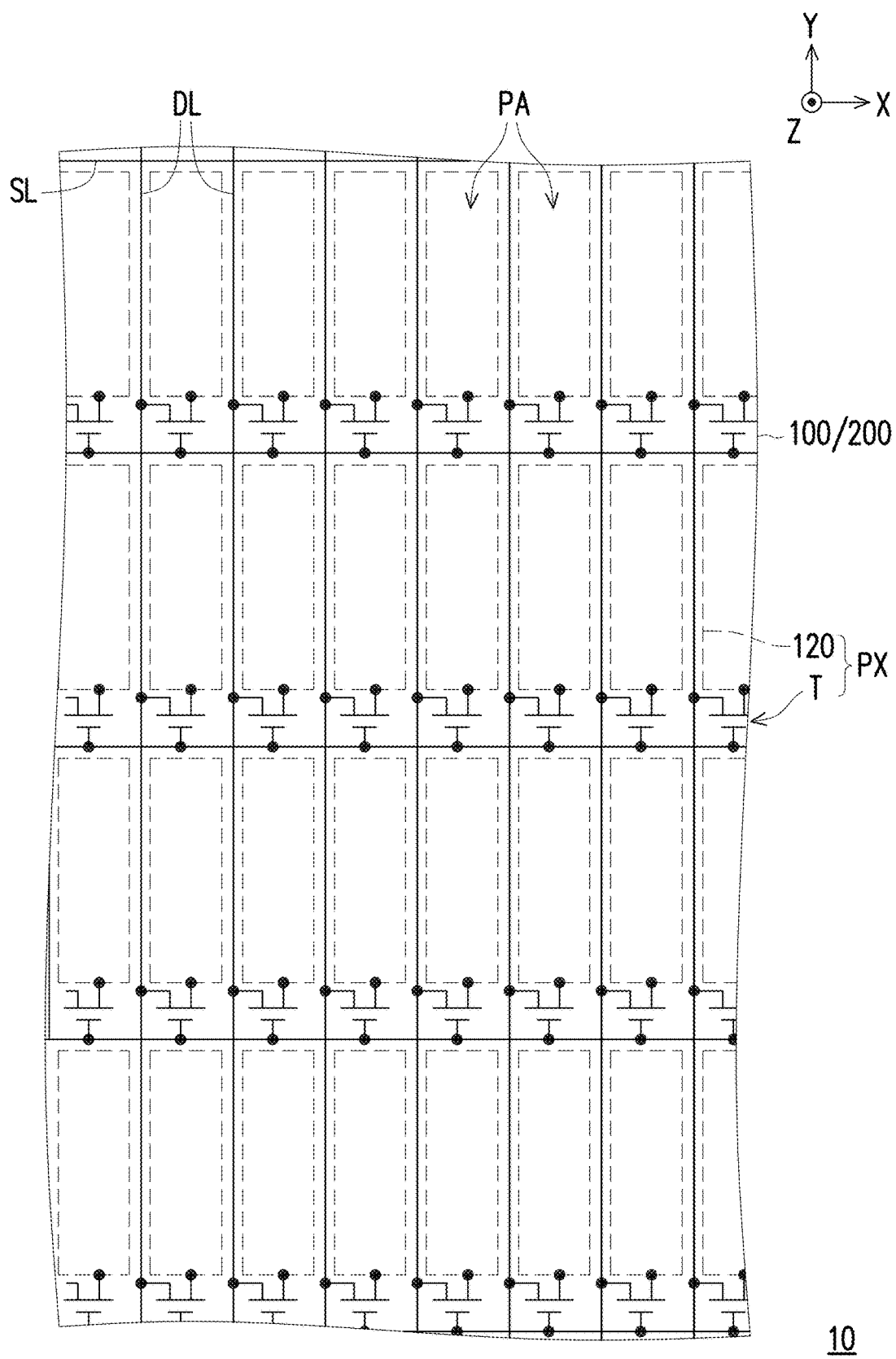
FIG. 1 is front view of a display panel in a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
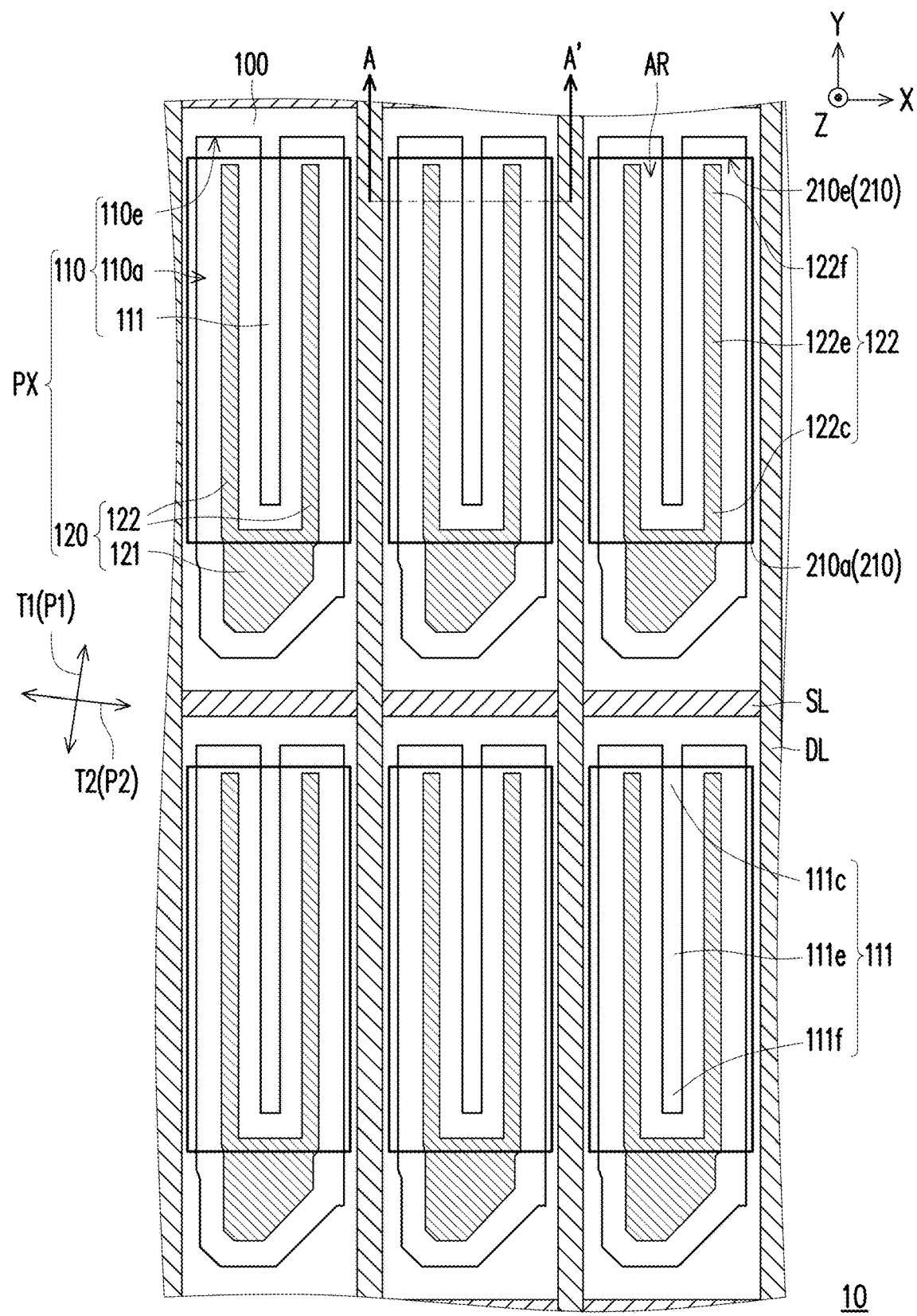
FIG. 2 is a partially enlarged view of the display panel in FIG. 1.
Figure 3:
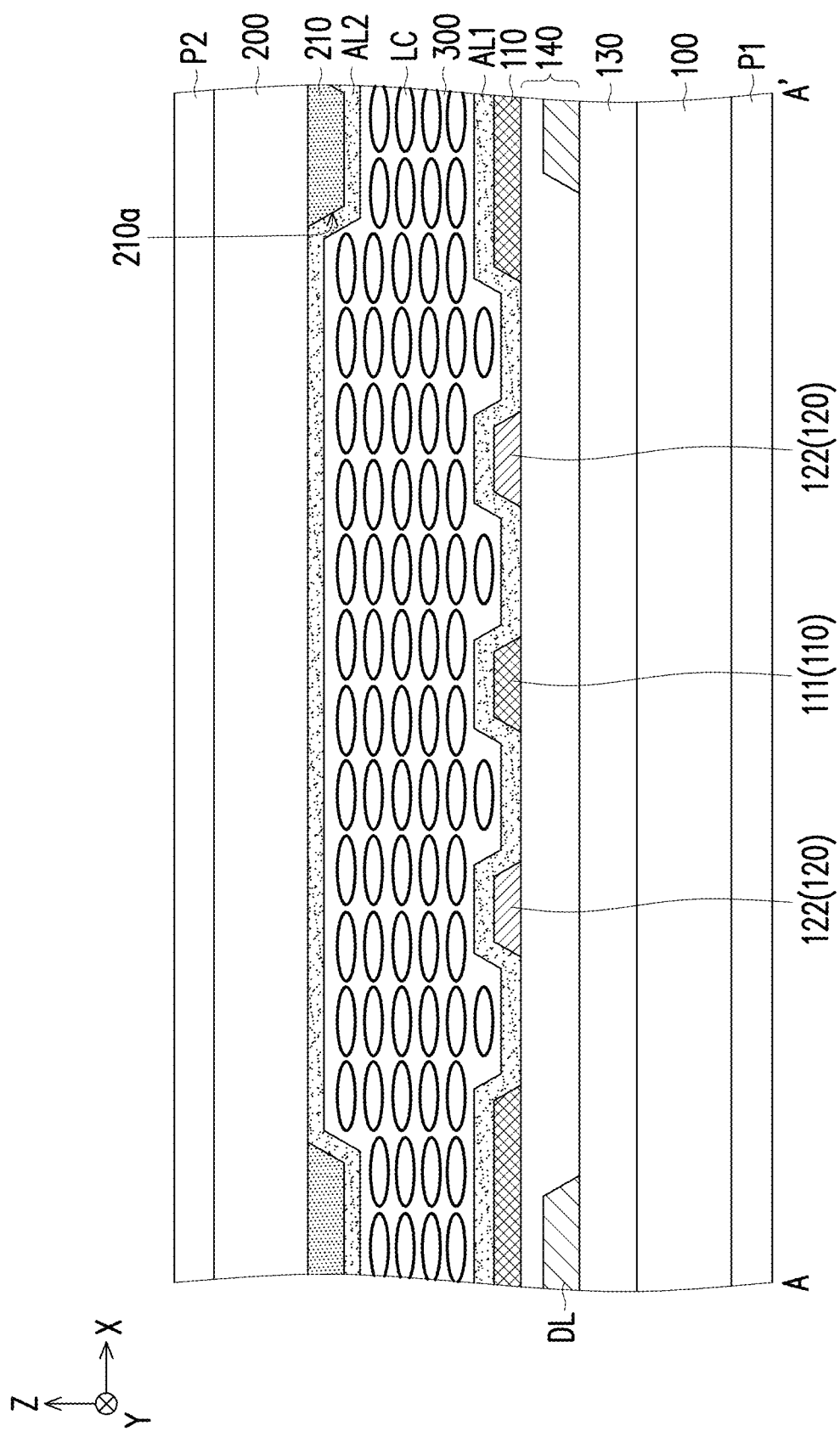
FIG. 3 is a cross-sectional view of the display panel of FIG. 2.
Figure 4:
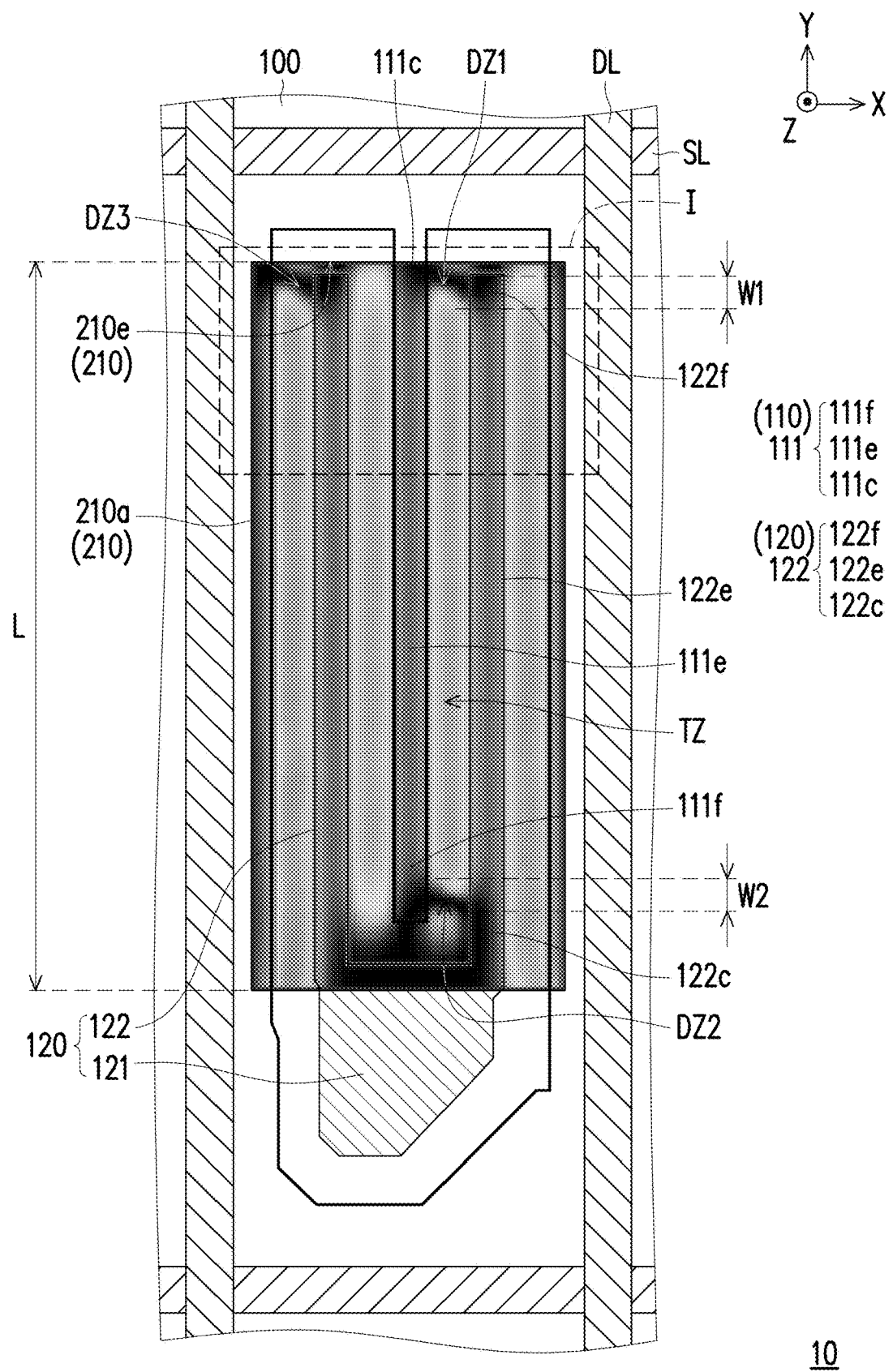
FIG. 4 is a front view of the display panel of FIG. 2 operated at a specific voltage.
Figure 5:
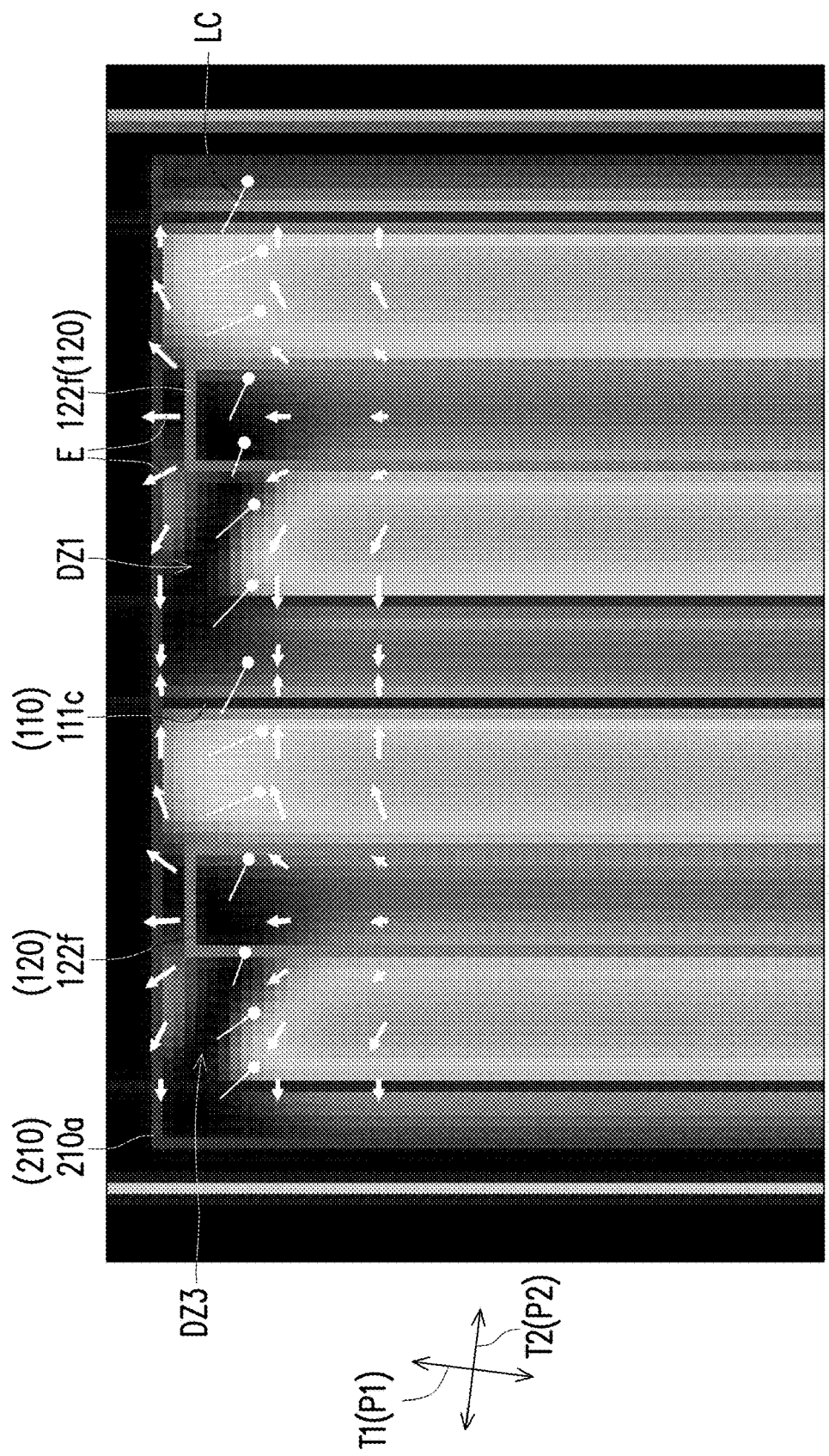
FIG. 5 is a partially enlarged view of a pixel structure in FIG. 4.
Figure 6:
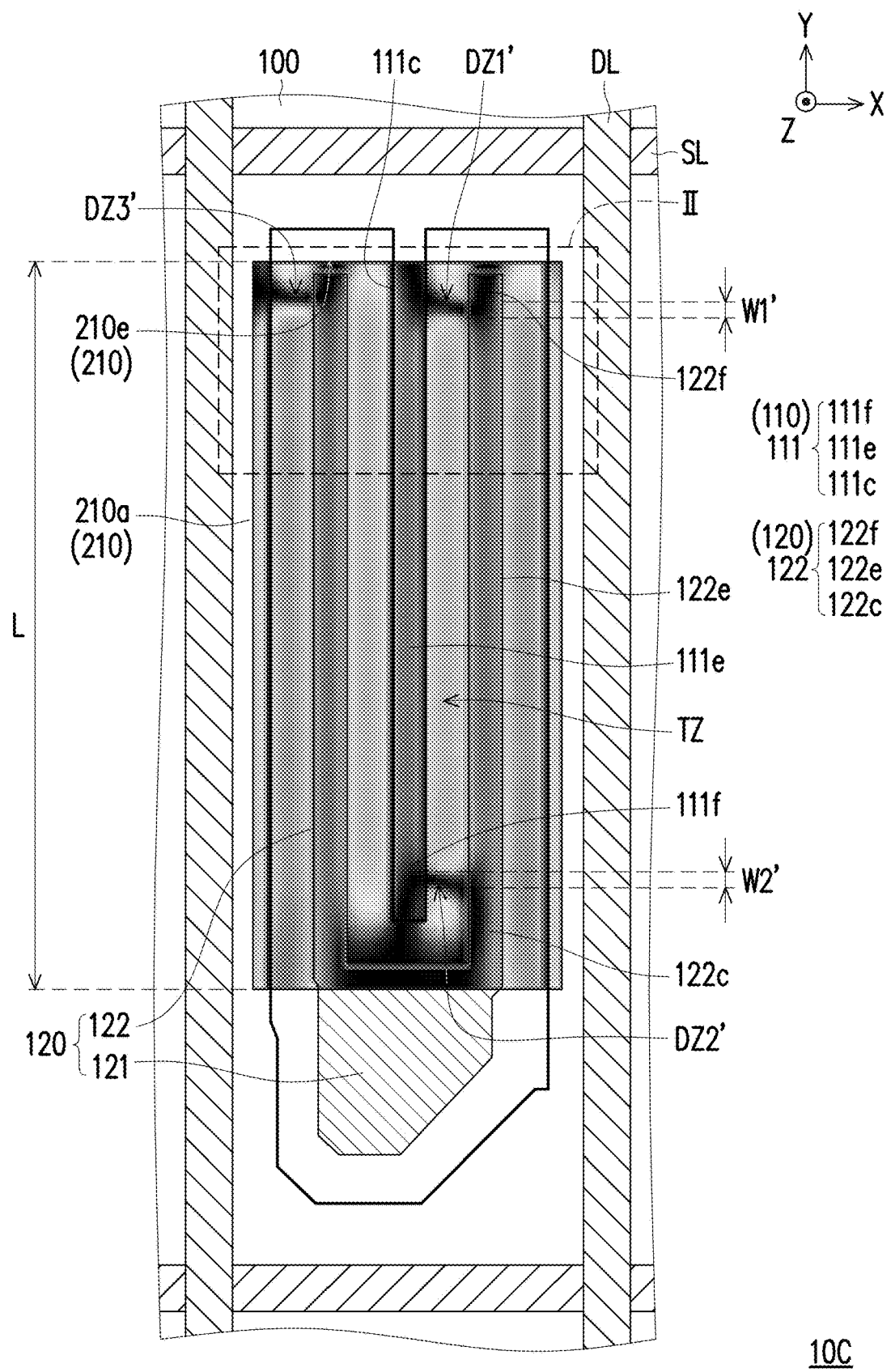
FIG. 6 is a front view of the display panel operated at a specific voltage of a first comparative example.
Figure 7:
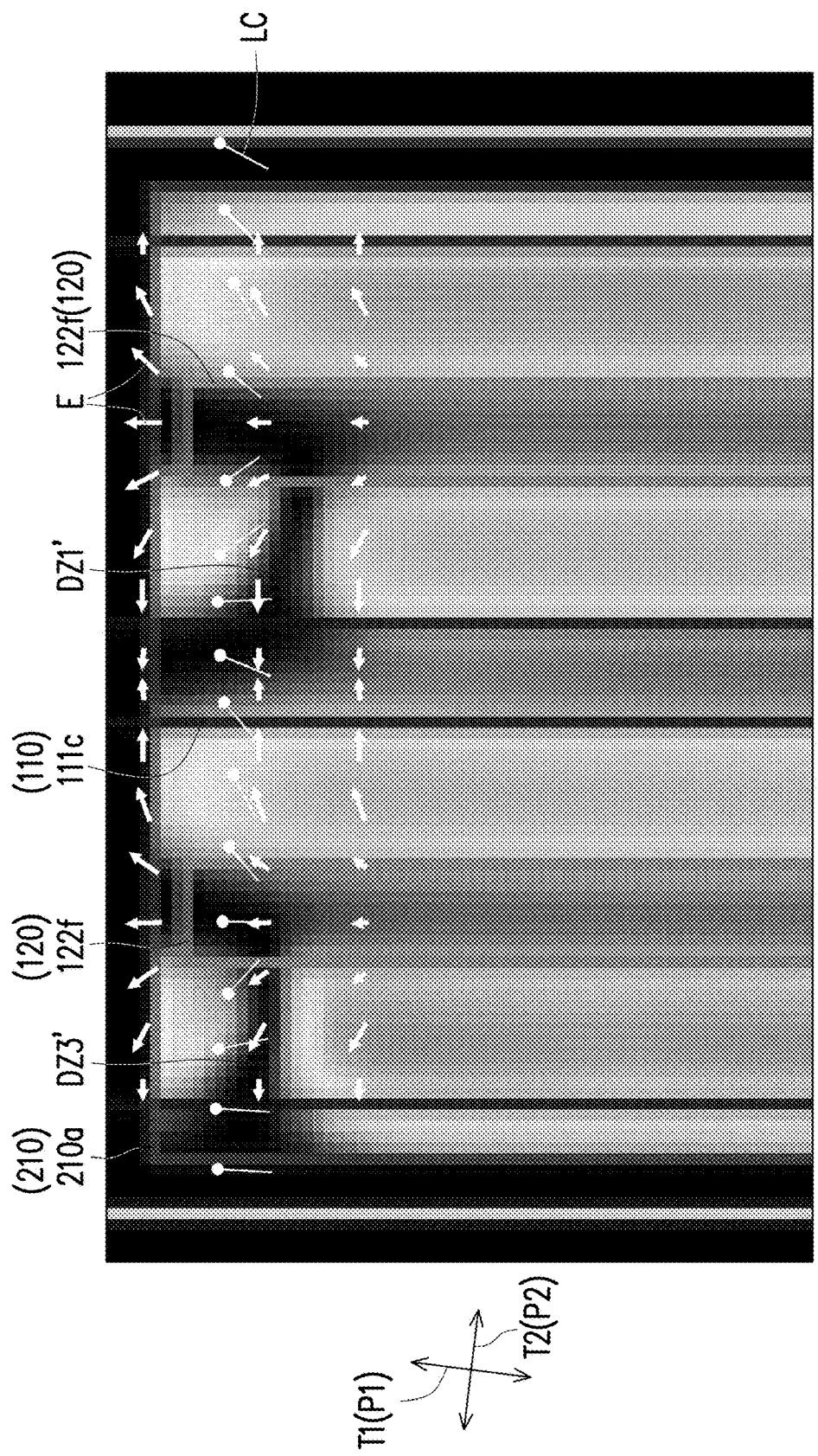
FIG. 7 is a partially enlarged view of a pixel structure in FIG. 6.

FIG. 1 is front view of a display panel in a first embodiment of the invention. FIG. 2 is a partially enlarged view of the display panel in FIG. 1. FIG. 3 is a cross-sectional view of the display panel of FIG. 2. FIG. 4 is a front view of the display panel of FIG. 2 operated at a specific voltage. FIG. 5 is a partially enlarged view of a pixel structure in FIG. 4. FIG. 6 is a front view of the display panel operated at a specific voltage of a first comparative example. FIG. 7 is a partially enlarged view of a pixel structure in FIG. 6. Specifically, FIG. 3 corresponds to a section line A-A' of FIG. 2, FIG. 5 corresponds to an area I of FIG. 4, and FIG. 7 corresponds to an area II of FIG. 6. For clarity of presentation, FIG. 2 omits the illustration of two alignment layers in FIG. 3.

Referring to FIG. 1 to FIG. 3, a display panel 10 includes a first substrate 100, a second substrate 200, a plurality of pixel structures PX, a light shielding pattern layer 210 and a liquid crystal layer 300. The first substrate 200 is disposed opposite to the first substrate 100, and the liquid crystal layer 300 is disposed between the first substrate 100 and the second substrate 200. The materials of the first substrate 100 and the second substrate 200 include glass, quartz, polymer substrate, or other suitable substrate materials. The liquid crystal layer 300 may include a plurality of liquid crystal molecules LC. For instance, in this embodiment, the pixel structures PX are disposed on the first substrate 100, and the light shielding pattern layer 210 is disposed on the second substrate 200. However, the invention is not limited in this regard. In other embodiment, the light shielding pattern layer may also be disposed on the first substrate 100. The light shielding pattern layer 210 has a plurality of openings 210a, and the openings 210a can define a plurality of opening areas AR separated form each other. The material of the light shielding pattern layer 210 includes metal or polymer (e.g., a black resin material).

In this embodiment, the display panel 100 further includes a plurality of data lines DL and a plurality of scan lines SL. For instance, the data line DL are arranged along a direction X and extend in a direction Y, and the data lines SL are arranged along the direction Y and extend in the direction X. More specifically, the data lines DL intersect the scan lines SL and define a plurality of pixel areas PA of the display panel 100. The pixel structures PX are respectively disposed inside the pixel areas PA, and overlap the openings 210a (or the opening areas AR) of the light shielding pattern layer 210.

The pixel structure PX includes a first electrode 110, a second electrode 120 and an active device T. The second electrode 120 is electrically independent of the first electrode 110 and electrically connected the active device T. Each of the active devices T is electrically connected to one corresponding data line DL and one corresponding scan line SL. The second electrode 120 of the pixel structure PX can be controlled by the corresponding active device T to receive an electrical signal transmitted via the corresponding data line DL to have a predetermined potential configuration. In other words, these pixel structures PX can all be independently controlled. In this embodiment, the display panel 10 may further include an active device layer 130 and a signal wiring layer 140, and the active device layer 130 is disposed between the first substrate 100 and the signal wiring layer 140. Here, the active devices T of the pixel structures PX are located in the active device layer 130, and the data lines DL and the scan lines SL may be located in the signal wiring layer 140, but not limited thereto. It should be understood that each of the active device layer 130 and the signal wiring layer 140 may also be provided with at least one insulation layer to achieve electrical insulation between various components (e.g., the scan lines SL and the data lines DL).

In detail, the first electrode 110 has an electrode opening 110a and a first finger portion 111 extending into the electrode opening 110a. The second electrode 120 overlaps the electrode opening 110a of the first electrode 110 in a normal direction (e.g., a direction Z) of the first substrate 100. In this embodiment, the second electrode 120 is disposed inside the electrode opening 110a of the first electrode 110 and has two second finger portions 122. The two second finger portions 122 of the second electrode 120 are respectively disposed on opposite sides of the first finger portion 111 of the first finger portion 110. More specifically, the first electrode 110 and the second electrode 120 of the pixel structure PX may be interdigitated electrodes. For instance, the first finger portion 111 of the first electrode 110 and the second first electrodes 122 of the second electrode 120 are alternately arranged along the direction X inside the electrode opening 110a and extend in the direction Y.

In this embodiment, the first electrodes 110 of the pixel structures PX can be connected to each to form a common electrode, and this common electrode may include a fixed potential or a ground potential. However, the invention is not limited in this regard. In other embodiments, the connection relationship of the first electrodes 110 of the pixel structures PX can be adjusted according to actual electrical property (e.g., parasitic capacitance) considerations. For example, the first electrodes 110 of a part of the pixel structures PX arranged along the direction Y may be connected to each other, but the first electrodes 110 of another part of the pixel structures PX arranged along the direction X are separated from each other.

On the other hand, the first electrode 110 and the second electrode 120 are, for example, light-transmitting electrodes, and the materials of the light-transmitting electrodes include metal oxides, such as indium tin oxide, indium zinc oxide, aluminum tin oxide, aluminum zinc oxide, indium gallium zinc oxide, or other suitable oxides, or a stacked layer of at least two of the above. However, the invention is not limited in this regard. According to other embodiments, the electrodes of the pixel structure PX may also use other conductive materials, such as metals, alloys, nitrides of metal materials, oxides of metal materials, nitrogen oxides of metal materials, or other suitable materials, or a stacked layer of metal materials and other conductive materials. It should be noted that, in this embodiment, the numbers of the first finger portions 111 of the first electrode 110 and the second finger portions 122 of the second electrode 120 are respectively one and two as examples, but the invention is not limited in this regard. In other embodiments, the numbers of the finger portions of the two electrodes may also be adjusted according to actual design requirements (e.g., a pixel size).

On the other hand, the display panel 10 further includes a first polarizer P1 and a second polarizer P2, which are respectively disposed on surfaces on two sides of the first substrate 100 and the second substrate 200 facing away from each other. The first polarizer P1 and the second polarizer P2 respectively include a first transmission axis T1 and a second transmission axis T2, and an axial direction of the first transmission axis T1 of the first polarizer P1 is selectively perpendicular to an axial direction of the second transmission axis T2 of the polarizer P2. It should be noted that, in this embodiment, the axial directions of the transmission axes of the two polarizers are neither parallel nor perpendicular to an extending direction (e.g., example, direction Y) of the finger portion of the electrode of the pixel structures PX. For instance, an included angle between the axial direction of the first transmission axis T1 of the first polarizer P1 and an extending direction of the first finger portion 111 of the first electrode 110 (or the second finger portion 122 of the second electrode 120) is greater than 0 degree and less than 10 degrees, and an included angle between the axial direction of the second transmission axis T2 of the second polarizer P2 and the extending direction of the first finger portion 111 of the first electrode 110 (or the second finger portion 122 of the second electrode 120) is greater than 80 degree and less than 90 degrees. However, the invention is not limited in this regard.

In order to allow the liquid crystal molecules LC of the liquid crystal layer 300 to have a stable arrangement state without being affected by an electric field, the display panel 10 further includes a first alignment layer AL1 and a second alignment layer AL2. The liquid crystal layer 300 is sandwiched between the first alignment layer AL1 and the second alignment layer AL2. The first alignment layer AL1 is located between the first substrate 100 and the liquid crystal layer 300, and the second alignment layer AL2 is located between the second substrate 200 and the liquid crystal layer 300. In this embodiment, the first alignment layer AL1 and the second alignment layer AL2 have a first alignment direction (not shown) and a second alignment direction (not shown), respectively, and the first alignment direction is anti-parallel to the second alignment direction. In other words, the liquid crystal molecules LC of the liquid crystal layer 300 are arranged in an anti-parallel arrangement. For example, in this embodiment, an alignment direction of the alignment layer is substantially parallel to the axial direction of the second transmission axis T2 of the second polarizer P2, but not limited thereto. In other embodiments, an included angle between the alignment direction of the alignment layer and the axial direction of the second transmission axis T2 of the second polarizer P2 may also be in the range of 0 degree to 10 degrees.

It should be noted that, in a front view direction of the display panel 10 (e.g., a reverse direction of the direction Z), the light shielding pattern layer 210 can shield the data lines DL, the scan lines SL, the active devices T, a part of the first electrode 110 and a part of the second electrode 120. The opening 210a can expose the first finger portion 111 of the first electrode 110 and the two second finger portions 122 of the second electrode 120 of the pixel structure PX. When the electrodes of the pixel structure PX are activated, an electric field formed between the first electrode 110 and the second electrode 120 will drive the liquid crystal molecules LC to rotate and form a corresponding optical axis arrangement state. Different optical axis arrangement states can allow a polarized light to have different polarization states after passing through the liquid crystal layer 300, so that different light output intensities can obtained. In other words, the light intensity of light rays from a backlight module (not shown) after passing through the display panel 10 can be adjusted by an intensity of the electric field between the first electrode 110 and the second electrode 120 of the pixel structure PX.

Due to the arrangement of the electrodes of the pixel structure PX, when the electrodes of the pixel structure PX are activated, the light rays emitted from different positions of the opening areas AR have different light intensities. For instance, when the display panel 10 is operated at a specific voltage, as shown in FIG. 4, a transmissive zone TZ and a dark zone ZD1 are provided between the first finger portion 111 of the first electrode 110 and the second finger portion 122 of the second electrode 120 (e.g., the second finger portion 122 on the right side of the drawing). In the extending direction of the finger portion (e.g., the direction Y), the first dark zone DZ1 is located between the transmissive zone TZ and a first edge 210e of the light shielding pattern layer 210 (or the display panel 10) for defining the opening 210a (the opening area AR). It should be noted that, the specific voltage is, for example, 97% of a value of a maximum operating voltage of the liquid crystal molecules LC of the liquid crystal layer 300, and the maximum operating voltage here is, for example, an operating voltage value when the display panel 10 reaches a maximum transmittance. It should be noted that, the first dark zone DZ1 has a first width W1 on one side of the second finger portion 122 in the extending direction of the finger portion. The opening area AR (or the opening 210a) has an opening length L in the extending direction of the finger portion. A percentage value of the first width W1 to the opening length L is less than 5%.

Specifically, the first finger portion 111 of the first electrode 110 has a first extension 111e and a first open end 111f and a first connecting end 111c disposed on opposite sides of the first extension 111e. The first open end 111f is closer to the second electrode 120 than the first connecting end 111c in the extending direction of the finger portion (e.g., the direction Y), and the first connecting end 111c is connected to an opening edge 110e of the first electrode 110 for defining the electrode opening 110a. The first connecting end 111c overlaps the first edge 210e of the light shielding pattern layer 210 in a normal direction of the first substrate 100 (e.g., the direction Z).

The second finger portion 122 of the second electrode 120 has a second extension 122e and a second open end 122f and a second connecting end 122c disposed on opposite sides of the second extension 122e. An extending direction of the second extension 122e is substantially parallel to the extending direction of the first extension 111e. The second open end 122f is closer to the first electrode 110 than the second connecting end 122c in the extending direction of the finger portion. As can known from FIG. 4, the first dark zone DZ1 is located between the first connecting end 111c of the first finger portion 111 and the second open end 122f of the second finger portion 122 on the right side of the drawing.

On the other hand, the second electrode 120 further includes a connecting portion 121 overlapping the electrode opening 110a, and the two second connecting ends 122c of the two second finger portions 122 of the second electrode 120 are connected to the connecting portion 121. As shown in FIG. 4, a second dark zone DZ2 located on one side of the transmissive zone TZ away from the first dark zone DZ1 is further provided between the first finger portion 111 of the first electrode 110 and the second finger portion 122 of the second electrode 120 (e.g., the second finger portion 122 on the right side of the drawing). More specifically, the second dark zone DZ2 is located between the first open end 111f of the first finger portion 111 and the second connecting end 122c of the second finger portion 122 on the right side of the drawing. It should be noted that, the second dark zone DZ2 has a second width W2 on one side of the first finger portion 111 in the extending direction of the finger portion, and a percentage value of the second width W2 of the second dark zone DZ2 to the opening length L is less than 5%.

It should be noted that, a third dark zone DZ3 is further provided between on a lateral side of the second finger portion 122 facing away from the first finger portion 111 on the left side of FIG. 4 and the first electrode 110. Since the first electrode 110 and the second electrode 120 are the interdigitated electrodes, the distribution of the third dark zones DZ3 is similar to that of the first dark zones DZ1, and detailed description regarding the same may be obtained according the relevant paragraphs above, which will not be repeated here.

Referring to FIG. 4 and FIG. 5, since the dielectric anisotropy of the liquid crystal molecules LC of the liquid crystal layer 300 of this embodiment is negative (i.e., the liquid crystal molecules LC of the liquid crystal layer 300 are negative liquid crystal molecules), the liquid crystal molecules LC tend to be aligned in a direction perpendicular to an electric field E. For instance, normal projections of the liquid crystal molecules LC overlapping the dark zone (e.g., the first dark zone DZ1, the second dark zone DZ2 or the third dark zone DZ3) in a long axis (or an optical axis) direction on the first substrate 100 are arranged on the same side facing the drawing, and substantially parallel to the axial direction of the first transmission axis T1 of the first polarizer P1 or the axial direction of the second transmission axis T2 of the second polarizer P2. In other words, these liquid crystal molecules LC with negative dielectric anisotropy do not form a multi-domain arrangement under the driving of the electric field between the first electrode 110 and the second electrode 120. Therefore, when being pressed by an external force, the liquid crystal molecules LC in the dark zone can quickly return to the original arrangement state (e.g., the arrangement state of FIG. 5), which can effectively avoid the occurrence of finger mura.

Conversely, if the dielectric anisotropy of the liquid crystal molecules LC is positive (i.e., the liquid crystal molecules LC of the liquid crystal layer 300 are positive liquid crystal molecules), the liquid crystal molecules LC tend to be aligned in a direction parallel to the electric field E. Referring to FIG. 6 and FIG. 7, in a display panel 10C of the comparative example, since the liquid crystal molecules LC are the positive liquid crystal molecules, the liquid crystal molecules LC overlapping the dark zone (e.g., a first dark zone DZ1', a second dark zone DZ2' or a third dark zone DZ3') form the multi-domain arrangement under the driving of the electric field between the first electrode 110 and the second electrode 120. Therefore, when being pressed by the external force, the liquid crystal molecules LC in the dark zone cannot quickly return to the original arrangement state (e.g., the arrangement state of FIG. 7), which leads to the occurrence of finger mura that significantly reduces the display quality of the display panel 10C.

It should be noted that the alignment direction of the alignment layer of the display panel 10C here is substantially parallel to the axial direction of the first transmission axis T1 of the first polarizer P1.

In the display panel 10C of the comparative example, since the liquid crystal molecules LC with positive dielectric anisotropy will form the multi-domain arrangement under the driving of the electric field, the optical dark pattern is also different from that of the display panel 10 of FIG. 4. For instance, a percentage value of a first width W1' of the first dark zone DZ1' to the opening length L is less than 5%, and a percentage value of a second width W2' of the second dark zone DZ2' to the opening length L is less than 5%.

It can be seen from the comparative example that the display panel 10 of this embodiment is able to prevent the liquid crystal molecules LC from forming the multiple-region arrangement under due to the liquid crystal molecules LC with negative dielectric anisotropy driven by the electric field, thereby effectively avoiding finger mura.

Figure 8:
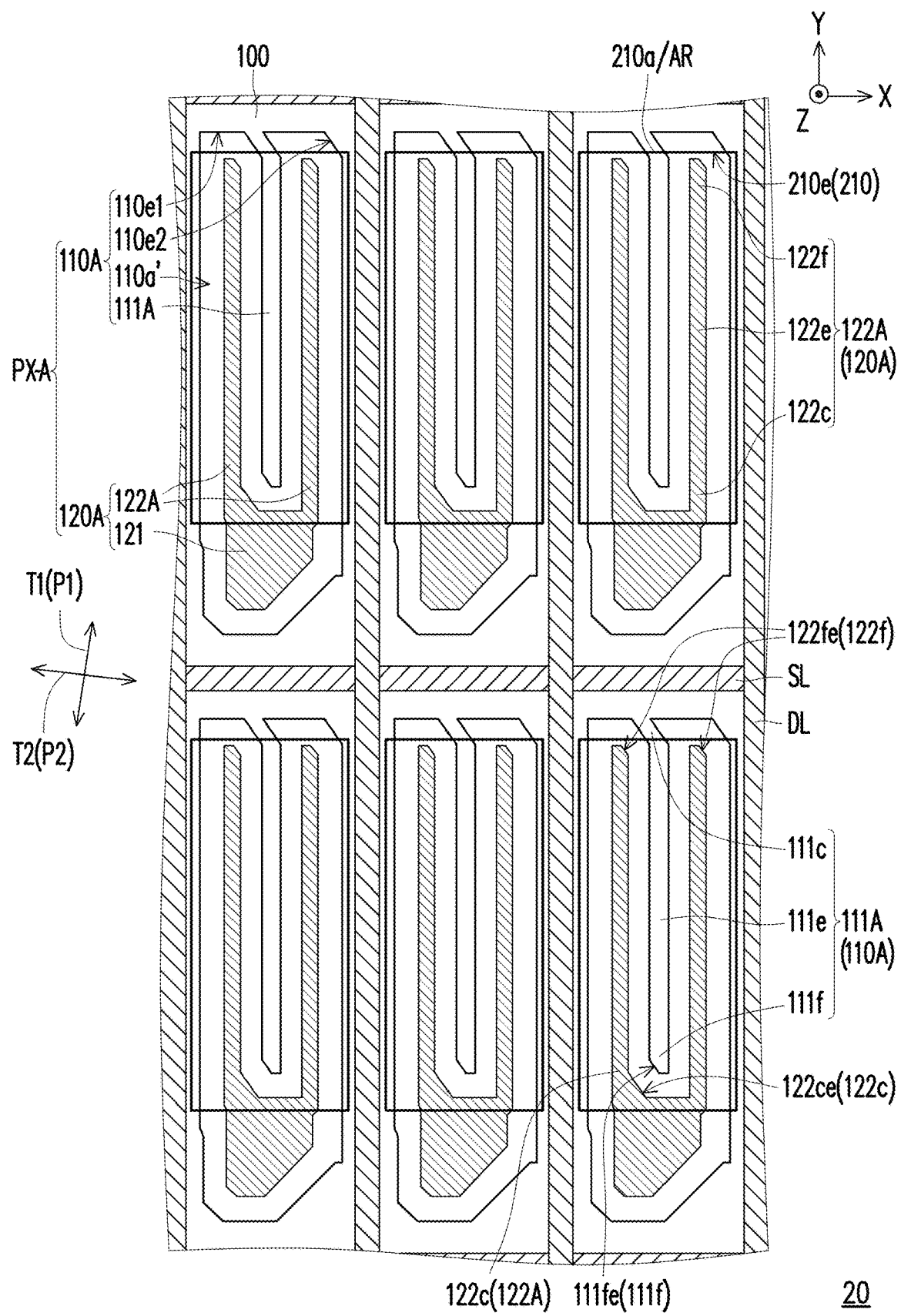
FIG. 8 is front view of a display panel in a second embodiment of the invention.
Figure 9:
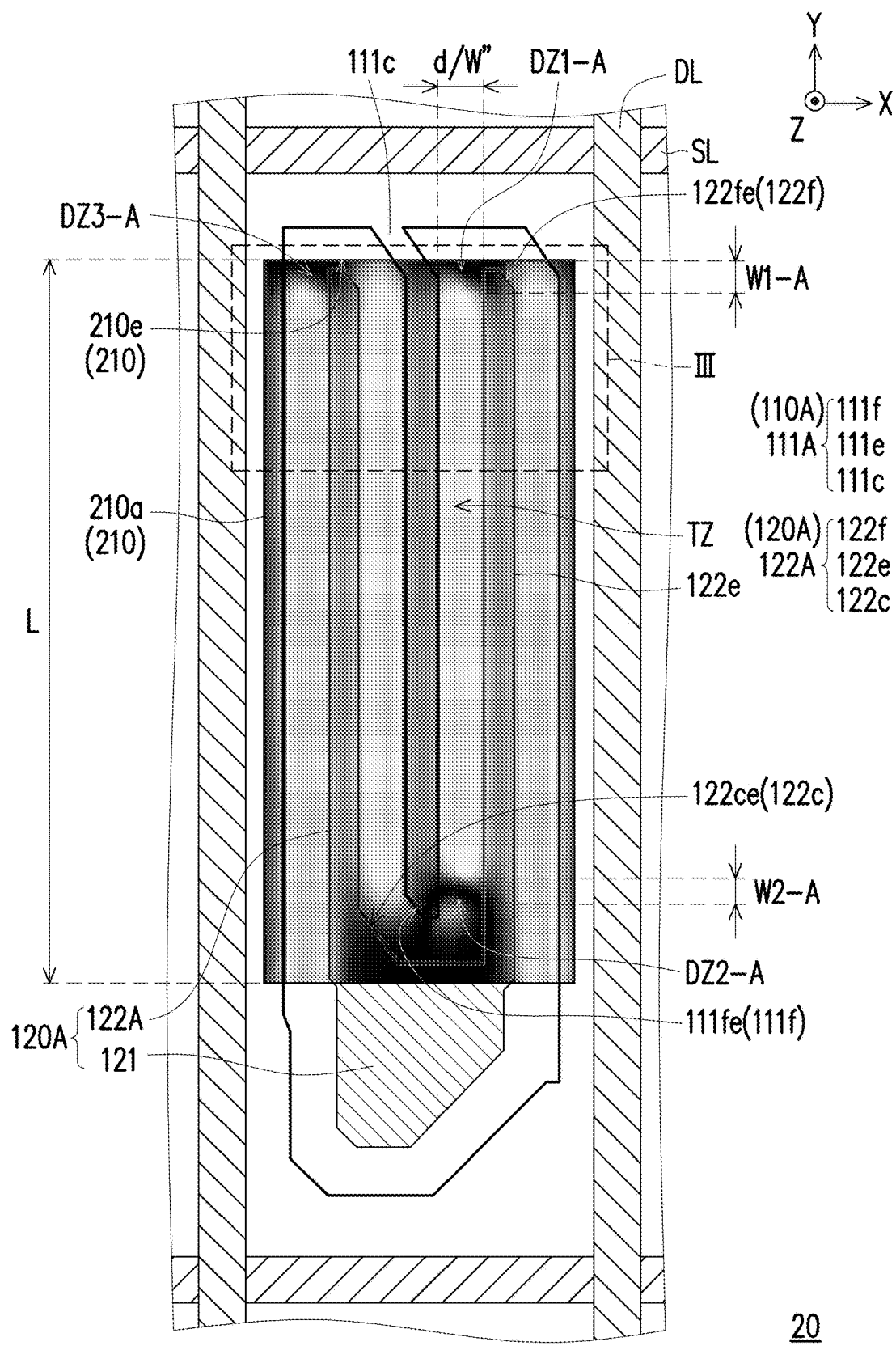
FIG. 9 is a front view of the display panel of FIG. 8 operated at a specific voltage.
Figure 10:
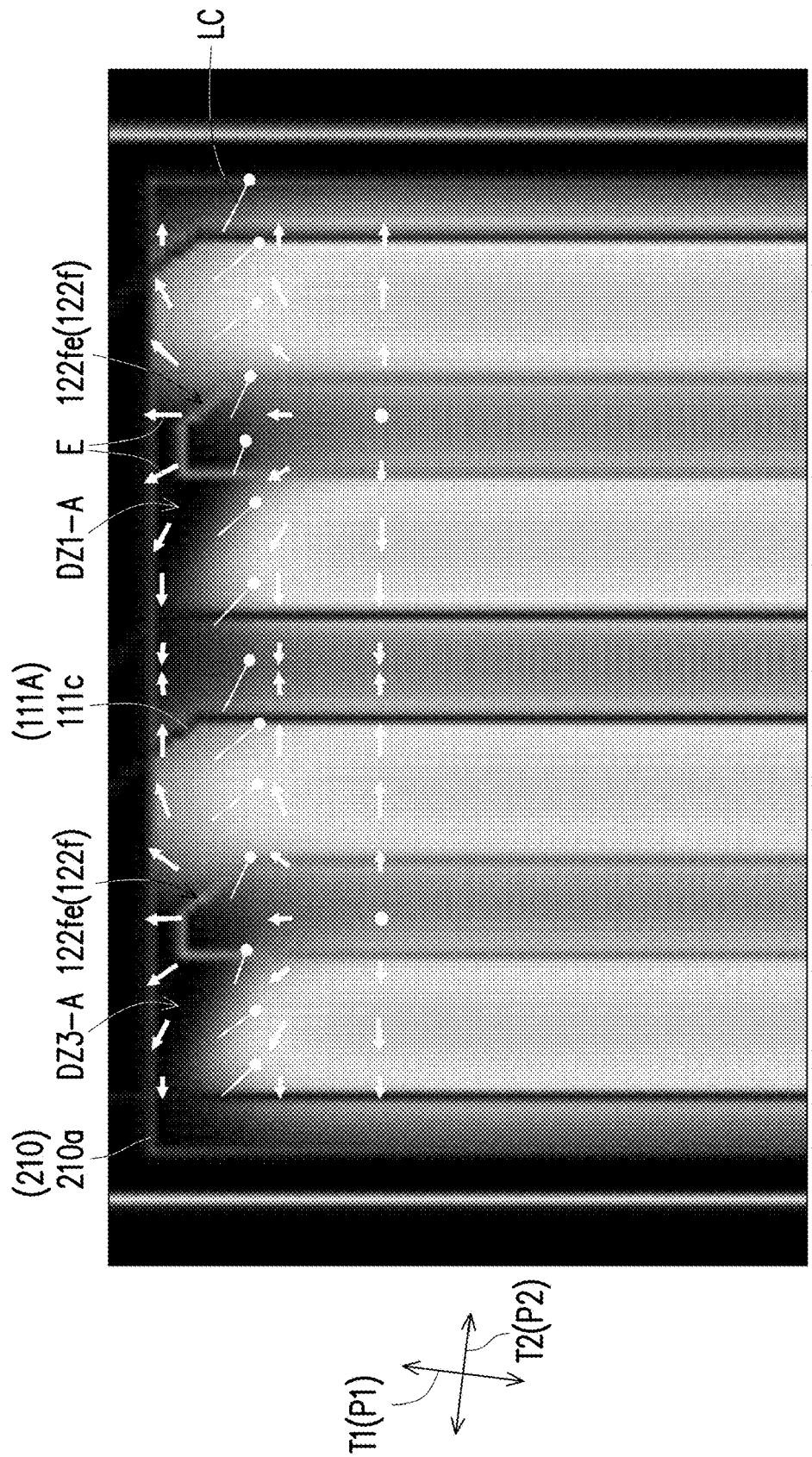
FIG. 10 is a partially enlarged view of a pixel structure in FIG. 9.
Figure 11:
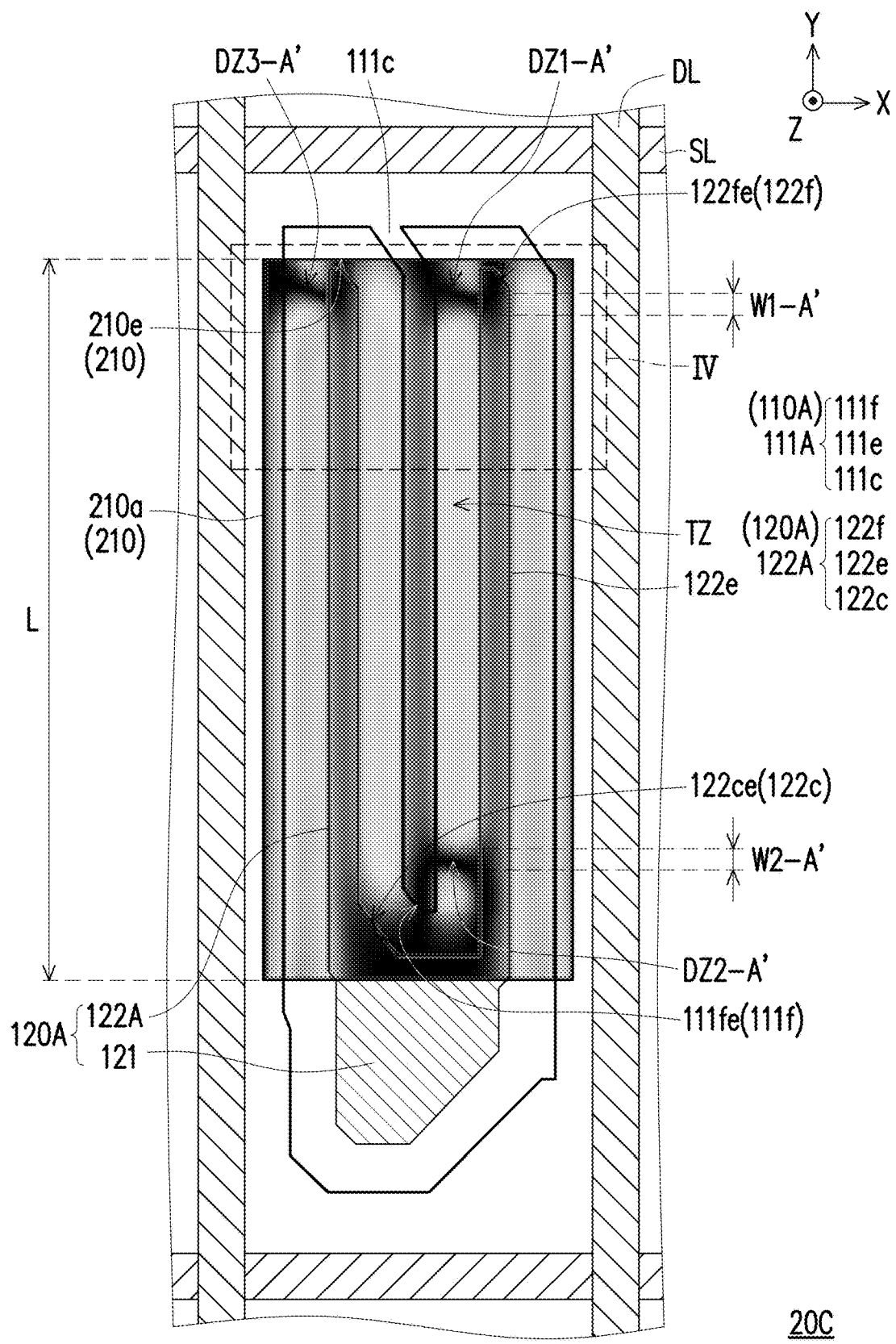
FIG. 11 is a front view of the display panel operated at a specific voltage of a second comparative example.
Figure 12:
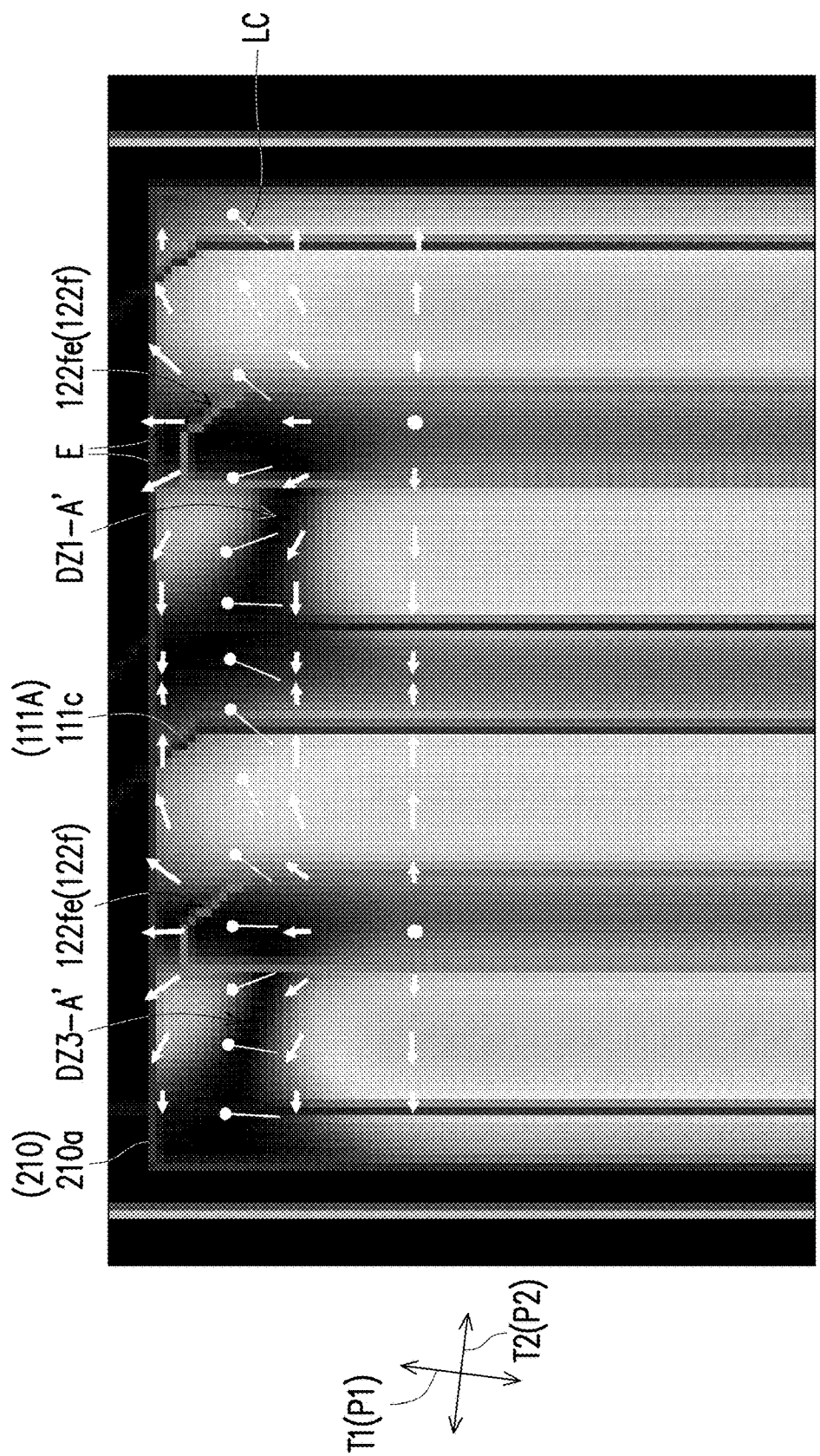
FIG. 12 is a partially enlarged view of a pixel structure in FIG. 11.

FIG. 8 is front view of a display panel in a second embodiment of the invention. FIG. 9 is a front view of the display panel of FIG. 8 operated at a specific voltage. FIG. 10 is a partially enlarged view of a pixel structure in FIG. 9. FIG. 11 is a front view of the display panel operated at a specific voltage of a second comparative example. FIG. 12 is a partially enlarged view of a pixel structure in FIG. 11. Specifically, FIG. 10 corresponds to an area III of FIG. 9, and FIG. 12 corresponds to an area IV of FIG. 1.

Referring to FIG. 8 and FIG. 9, the difference between a display panel 20 of this embodiment and the display panel 10 of FIG. 2 is that the configuration of the first electrode and the second electrode are different. Specifically, in this embodiment, the extending direction of the first connecting end 111c of a first finger portion 111A of a first electrode 110A of a pixel structure PX-A of the display panel 20 intersect the extending direction of the first extension 111e, and a second open end 122f of a second finger portion 122A of a second electrode 120A has a first inclined edge 122fe parallel to the extending direction of the first connecting end 111c of the first finger portion 111A. It should be noted that, a first dark zone DZ1-A is located on one side of the second open end 122f of the second finger portion 122A on the right side of the drawing facing away from the first inclined edge 122fe.

On the other hand, in this embodiment, the second connecting end 122c of the second finger portion 122A on the left side of FIG. 9 has a second inclined edge 122ce on one side closer to the first open end 111f of the first finger portion 111A. An extending direction of the second inclined edge 122ce is inclined to the extending direction of the second extension 122e of the second finger portion 122A. The first open end 111f of the first finger portion 111A has a third inclined edge 111fe parallel to the second inclined edge 122ce on one side opposite to the second inclined edge 122ce. It should be noted that, a second dark zone DZ2-A is located on one side of the first open end 111f of the first finger portion 111A facing away from the third inclined edge 111fe.

More specifically, the first electrode 110A has a first opening edge 110e1 and a second opening edge 110e2 for defining an electrode opening 110a'. The first connecting end 111c of the first finger portion 111A connects the first opening edge 110e1. The second opening edge 110e2 connects the first opening edge 110e1 and is opposite to the first inclined edge 122fe of the second open end 122f of the second finger portion 122A on the right side of FIG. 9. An extending direction of the second opening edge 110e2 is parallel to an extending direction of the first inclined edge 122fe.

On the other hand, similar to the display panel 10 of the foregoing embodiment, the dielectric anisotropy of the liquid crystal molecules LC of the display panel 20 of this embodiment is also negative. Therefore, a percentage value of a first width W1-A of the first dark zone DZ1-A to the opening length L is less than 5%, and a percentage value of the second width W2-A of the second dark zone DZ2-A to the opening length L is less than 5%.

Referring to FIG. 9 and FIG. 10, since the dielectric anisotropy of the liquid crystal molecules LC of the liquid crystal layer 300 of this embodiment is negative (i.e., the liquid crystal molecules LC of the liquid crystal layer 300 are negative liquid crystal molecules), the liquid crystal molecules LC tend to be aligned in a direction perpendicular to an electric field E. For instance, normal projections of the liquid crystal molecules LC overlapping the dark zone (e.g., the first dark zone DZ1-A, the second dark zone DZ2-A or the third dark zone DZ3-A) in a long axis direction on the first substrate 100 are substantially arranged on the same side facing the drawing. In other words, these liquid crystal molecules LC with negative dielectric anisotropy do not form the multi-domain arrangement under the driving of the electric field between the first electrode 110A and the second electrode 120A. Therefore, when being pressed by an external force, the liquid crystal molecules LC in the dark zone can quickly return to the original arrangement state (e.g., the arrangement state of FIG. 10), which can effectively avoid the occurrence of finger mura.

Conversely, if the dielectric anisotropy of the liquid crystal molecules LC is positive (i.e., the liquid crystal molecules LC of the liquid crystal layer 300 are positive liquid crystal molecules), the liquid crystal molecules LC tend to be aligned in a direction parallel to the electric field E. Referring to FIG. 11 and FIG. 12, in a display panel 20C of the comparative example, since the liquid crystal molecules LC are positive liquid crystal molecules, the liquid crystal molecules LC overlapping the dark zone (e.g., a first dark zone DZ1-A', a second dark zone DZ2-A' or a third dark zone DZ3-A') form the multi-domain arrangement under the driving of the electric field between the first electrode 110A and the second electrode 120A. Therefore, when being pressed by the external force, the liquid crystal molecules LC in the dark zone cannot quickly return to the original arrangement state (e.g., the arrangement state of FIG. 12), which leads to the occurrence of finger mura that significantly reduces the display of the display panel 20C.

In the display panel 20C of the comparative example, since the liquid crystal molecules LC with positive dielectric anisotropy will form the multi-domain arrangement under the driving of the electric field, the optical dark pattern is also different from that of the display panel 20 of FIG. 9. For instance, a percentage value of a first width W1-A' of the first dark zone DZ1-A' to the opening length L is less than 5%, and a percentage value of the second width W2-A' of the second dark zone DZ2-A' to the opening length L is less than 5%.

It can be seen from the comparative example that the display panel 20 of this embodiment is able to prevent the liquid crystal molecules LC from forming the multiple-region arrangement under due to the liquid crystal molecules LC with negative dielectric anisotropy driven by the electric field, thereby effectively avoiding finger mura.

It should be noted that, since the first electrode 110A and the second electrode 120A of the pixel structure PX-A of this embodiment further includes the design of the inclined edges overlapping the opening areas AR (e.g., the first inclined edge 122fe, the second inclined edge 122ce and the third inclined edge 111fe), a width W" of a portion where a normal projection of the first dark zone DZ1-A of the display panel 20 on the first substrate 100 is connected to a normal projection of the first edge 210e of the light shielding pattern layer 210 on the first substrate 100 in the direction X is equal to a distance d between the first finger portion 111A and the second finger portion 122A on the right side of FIG. 9. In other words, the design of the inclined edges of the electrode can further push the dark zone toward the edge of the opening area AR, so as to further inhibit the multiple-region arrangement of the liquid crystal molecules LC from forming under the driving of the electric field.

In the display panel of an embodiment of the invention, the first electrode and the second electrode of the pixel structure are located on the same side of the liquid crystal layer, and the first finger portion is located between the two second finger portions of the second electrode. The negative liquid crystal molecules of the liquid crystal layer can allow the width of the dark zone between the first finger portion and the second finger portions on one side of the open end of the finger portion to the opening length to be less than 5%. In this way, when being pressed by the external force, the liquid crystal molecules in the dark zone can quickly return to the original arrangement state, so as to avoid the occurrence of finger mura.

Although the disclosure has been described in detail with reference to the foregoing embodiments, a person of ordinary skill in the art should understand that modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the disclosure.

The invention claimed is:

1. A display panel, the display panel comprising:
a first substrate;
a second substrate, disposed opposite to the first substrate, a light shielding pattern layer being disposed on the second substrate, the light shielding pattern layer having a plurality of opening areas separated from each other;
a liquid crystal layer, disposed between the first substrate and the second substrate, and comprising a plurality of negative liquid crystal molecules; and
a plurality of pixel structures, respectively overlapping the plurality of opening areas, and each of the plurality of pixel structures comprising:
a first electrode and a second electrode, overlapping one of the plurality of opening areas and located on the same side of the liquid crystal layer, the first electrode having an electrode opening overlapping the one of the plurality of opening areas and a first finger portion extending into the electrode opening, the second electrode having two second finger portions overlapping the electrode opening, the first finger portion and the two second finger portions being alternately arranged along a first direction inside the electrode opening and extending in a second direction, the first direction intersecting the second direction,
wherein the first electrodes of the pixel structures are connected with each other to form a common electrode having a fixed potential or a ground potential, the second electrode of each of the plurality of pixel structures receives an electrical signal transmitted via a corresponding data line to have a predetermined potential configuration, a transmissive zone and a first dark zone are provided between one of the two second finger portions and the first finger portion of each of the plurality of pixel structures of the display panel, the first dark zone is located between the transmissive zone and a first edge of the display panel for defining each of the plurality of opening areas in the second direction, the first dark zone has a first width on one side of the second finger portions in the second direction, each of the plurality of opening areas has an opening length in the second direction, and a percentage value of the first width to the opening length is less than 5%.

2. The display panel of claim 1, wherein the first finger portion has a first open end and a first connecting end opposite to each other, the first open end is closer to the second electrode than the first connecting end in the second direction, the first connecting end is connected to an opening edge of the first electrode for defining the electrode opening, each of the two second finger portions has a second open end and a second connecting end opposite to each other, and the second open end is closer to the first electrode than the second connecting end in the second direction, wherein the first dark zone is located between the first connecting end of the first finger portion and the second open end of one of the two second finger portions.

3. The display panel of claim 2, wherein the second electrode further comprises a connecting portion overlapping the electrode opening, the second connecting end of each of the two second finger portions is connected to the connecting portion, a second dark zone is further provided between the one of the two second finger portions and the first finger portion of each of the plurality of pixel structures of the display panel, the second dark zone is located on one side of the transmissive zone away from the first dark zone, the second dark zone has a second width on one side of the first finger portion in the second direction, and a percentage value of the second width to the opening length is less than 5%.

4. The display panel of claim 3, wherein the second dark zone is located between the first open end of the first finger portion and the second connecting end of the one of the two second finger portions.

5. The display panel of claim 1, wherein the first finger portion has a first extension and a first connecting end and a first open end disposed on opposite sides of the first extension, and the first connecting end overlaps the first edge of the display panel for defining the corresponding opening area, wherein an extending direction of the first connecting end intersects an extending direction of the first extension, each of the two second finger portions has a second extension and a second open end disposed between the second extension and the first edge, an extending direction of the second extension is parallel to the extending direction of the first extension, and the second open end has a first inclined edge parallel to the extending direction of the first connecting end.

6. The display panel of claim 5, wherein the first dark zone is located on one side of the second open end of the one of the two second finger portions facing away from the first inclined edge.

7. The display panel of claim 5, wherein the second electrode further comprises a connecting portion overlapping the electrode opening, and each of the two second finger portions further comprises a second connecting end connecting the second extension and the connecting portion, wherein the second connecting end of the other one of the two second finger portions has a second inclined edge on one side closer to the first open end, an extending direction of the second inclined edge is inclined to the extending direction of the second extension, and the first open end has a third inclined edge parallel to the second inclined edge on one side opposite to the second inclined edge.

8. The display panel of claim 7, wherein a second dark zone is further provided between the one of the two second finger portions and the first finger portion of each of the plurality of pixel structures of the display panel, the second dark zone is located on one side of the transmissive zone away from the first dark zone, and the second dark zone is located on one side of the first open end facing away from the third inclined edge.

9. The display panel of claim 8, wherein the first electrode further comprises a first opening edge and a second opening edge for defining the electrode opening, the first connecting end of the first finger portion connects the first opening edge, the second opening edge connects the first opening edge and is opposite to the first inclined edge of the second open end of the one of the two second finger portions, and an extending direction of the second opening edge is parallel to an extending direction of the first inclined edge.

10. The display panel of claim 1, wherein a width of a portion where a normal projection of the first dark zone on the first substrate is connected to a normal projection of the first edge for defining the corresponding opening area on the first substrate in the first direction is equal to a distance between the first finger portion and the one of the two second finger portions.

\* \* \* \* \*